United States Patent [19]

Komarneni et al.

[11] Patent Number: 5,030,592
[45] Date of Patent: Jul. 9, 1991

[54] HIGHLY DENSE CORDIERITE AND METHOD OF MANUFACTURING SAME

[75] Inventors: Sridhar Komarneni; Ann M. Kazakos; Rustum Roy, all of State College, Pa.

[73] Assignee: The United States of America as represented by the Secretary of the Air Force, Washington, D.C.

[21] Appl. No.: 427,407

[22] Filed: Oct. 26, 1989

[51] Int. Cl.$^5$ .............................................. C03C 10/08
[52] U.S. Cl. .......................................... 501/9; 501/12; 501/119; 501/120
[58] Field of Search ....................... 501/9, 119, 120, 12

[56] References Cited

U.S. PATENT DOCUMENTS

| | | | |
|---|---|---|---|
| 4,367,292 | 1/1983 | Sano et al. | 501/119 |
| 4,587,172 | 5/1986 | Roy et al. | 428/450 |
| 4,605,594 | 8/1986 | Owens et al. | 428/373 |
| 4,675,302 | 6/1987 | Roy et al. | 501/123 |
| 4,793,980 | 12/1988 | Torobin | 423/213.5 |
| 4,801,566 | 1/1989 | Limaye et al. | 501/104 |
| 4,810,681 | 3/1989 | Hayakawa | 501/119 |
| 4,829,031 | 5/1989 | Roy et al. | 501/134 |
| 4,898,842 | 2/1990 | David | 501/9 |

Primary Examiner—William R. Dixon, Jr.
Assistant Examiner—Alan Wright
Attorney, Agent, or Firm—Thomas C. Stover; Donald J. Singer

[57] ABSTRACT

Compositionally triphasic nanocomposite gel is made by mixing two or more sols of ceramic precursor oxides. Such gel is then dried and ground to a fine powder which is pressed into compact bodies. The compact bodies are thereafter fired in a sintering oven at from 1100° C. to 1400° C. and, aided by the heat of reaction of the two or more nono gel powders, the (heterogeneous) mixture of such powders crystallizes into a homogeneous crystalline ceramic of α-cordierite at up to 100% of theoretical density. Thus, novel method of manufacture and novel ceramic end-product are provided.

22 Claims, 1 Drawing Sheet

HIGHLY DENSE CORDIERITE AND METHOD OF MANUFACTURING SAME

BACKGROUND OF THE INVENTION

1. Field of the Invention

This invention relates to cordierite bodies and method of manufacture thereof, particularly of high density cordierite bodies.

2. The Prior Art

Cordierite ceramic has an extensive range of industrial applications due to its low thermal expansion coefficient, low dielectric constant, good thermal shock resistance and chemical resistivity. Ceramic parts made of cordierite are used as carriers of catalysts in automobile systems, as heat exchangers in gas turbine engines and as electronic components.

It is desirable that the cordierite ceramic be as homogeneous, dense and of low porosity as possible, to enhance its properties, including those listed above, as well as for the strength and durability of the cordierite body.

Prior art methods of manufacture of cordierite have not been satisfactory. For example, in the solid state method, one combines crystals of oxides (sized 1 to 10 micrometers) of, e.g., silica, alumina and magnesia, grinds the particles and sinters them at over 1400° C., to form a nonhomogeneous ceramic which is then reground and refired in successive stages, to improve the homogeneity and density thereof in a laborious process. However, impurites are inevitably introduced with the mixing of the oxide crystals and a high degree of homogeneity and density is not realized.

U.S. Pat. No. 4,810,681 to Hayakawa (1989) discloses a similar method of manufacturing cordierite ceramics in which up to 80% by weight of cordierite crystals and up to 20% by of, e.g, a powder of zirconium oxide, are milled and mixed together, molded to form a body and then fired at over 1350° C. to form a sintered body of cordierite ceramic. This is another version of the prior art solid state method, which results in a ceramic product having up to 20% impurities therein, to the detriment of the physical properties thereof noted above. Also in such process there are two phases, cordierite and zirconium oxide, which can cause structural weakness at the interfaces thereof in the ceramic endproduct. Further by this method, one obtains a cordierite ceramic that has up to 6% porosity (or is 94% dense), to the detriment of the structural strength thereof.

A method for making cordierite ceramics of high homogeneity and density has therefore not been found and there is a need and market for an improved cordierite ceramic and manufacturing method therefor.

There has now been discovered a method for manufacturing cordierite ceramics of high homogeneity, high density and low porosity, to produce a new cordierite ceramic of enhanced properties and durability.

SUMMARY OF THE INVENTION

Broadly the present invention provides a method for the manufacture of dense cordierite bodies comprising, mixing at least two sols of nano ceramic precursor oxides to make a compositionally triphasic nanocomposite gel suitable for manufacture of the bodies.

In one application, the above gel is dried, ground into powder and pressed into a body, which body is sintered at between 1100° C. and 1400° C., to form a dense cordierite ceramic. The enhanced densification of such cordierite is due, at least in part, to the contribution of the heat of reaction from the nano sized oxide components during sintering thereof.

By "ceramic precursor oxides", as used herein, is meant oxides such as silica, alumina, magnesia, magnesium carbonate, magnesium hydroxide, magnesium oxide, aluminum hydroxide and aluminum oxyhydroxide and other oxides useful for making cordierite ceramics.

The invention further provides high density cordierite bodies of improved homogeneity and density made possible by the method of the present invention.

BRIEF DESCRIPTION OF THE DRAWINGS

The invention will become more apparent from the following detailed specification and drawings in which.

DESCRIPTION OF PREFERRED EMBODIMENTS

Figure 1:
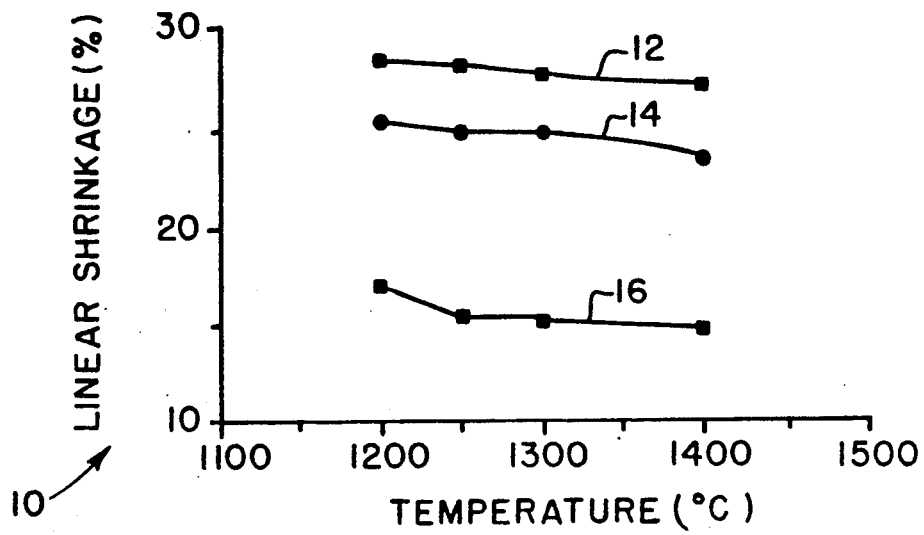
FIG. 1 is a graph showing the percent shrinkage upon sintering, of cordierite gel powder bodies made of a certain monophasic gel and made of two types of triphasic nanocomposite gels

According to the invention, cordierite ceramics of high density and low porosity are made by preparing two or more compositionally triphasic nanocomposite gels from sols of ceramic precursor oxides. The gels are dried and further processed from a heterogeneous amorphous phase into a homogeneous crystalline phase by sintering into highly dense cordierite ceramic bodies as described below.

Further according to the present invention, cordierite powders are synthesized by a sol-gel process, utilzing, e.g., a compositionally triphasic nanocomposite gel made with two sols and one solution or employing a truly compositionally triphasic nanocomposite gel made from three (or more) sols. Such procedure includes mixing discrete non-crystalline, semi-crystalline or even crystalline sols of different components to yield well densified ceramic materials.

By "nanocomposite" as used herein, is meant a class of materials which are heterogeneous on a nanometer scale without regard to the specific number of chemical components, as long as there are two or more. The nano sized amorphous particles of the gels contrast with the micrometer sized crystalline particles employed in prior art cordierite manufacture.

According to the invention, two or more sols of oxides, e.g., of silica, alumina and/or magnesia, are mixed in solution while stirring, the mixture is gelled in an oven at, e.g., 100° C. and then dried.

After drying, the triphasic nanocomposite gel is ground, calcined, and gently reground into a fine powder, as more fully described in the examples given below. The powders are then pressed or molded into a body of desired shape for sintering.

The so-shaped bodies of heterogeneous gel powder are sintered, e.g., in a furnace at from 1100° C. to 1400° C. for, e.g., 4 to 8 hours to form a homogeneous crystalline α-cordierite ceramic of $Mg_2Al_4Si_5O_{18}$.

By the method of the invention, such cordierites of high density e.g., 2.480 to 2.512 g/cc and of low or no discernible porosity are obtained. That is, the method of the invention enables the manufacture of cordierite at up to 100% of theoretical density or 2.512 g/cc, as further discussed below and shown in FIG. 2. Further, the method of the present invention permits sintering of the above gel powder bodies without the need of any sintering aids, which further enhances the homogeneity, purity and density of the cordierite product.

Due to the high density of the cordierite ceramic of the invention, particularly α-cordierite (as opposed to β-cordierite or μ-cordierite which have the same formula of $Mg_2Al_4Si_5O_{18}$ but are of but different crystalline structures) is very durable and has enhanced properties of low thermal expansion coefficient, low dielectric constant, good thermal shock resistance and chemical resistivity.

The enhanced densification of α-cordierite, utilizing triphasic nanocomposite sol-gel processing, is, at least in part, due to the contribution of the heat of reaction of the two or more gel powder components. That is, the nano sized sol gel particles exhibit increased surface area (over larger sized particles) which permits significant heat of reaction to be generated among the two or more components, which aids the sintering process from within and enhances the densification of the resulting cordierite ceramic.

Seeding of the above gels with α-cordierite did not significantly affect their densification, as more fully discussed following the examples below.

The following examples serve to illustrate the invention but should not be construed in limitation thereof. In the below examples, a single phase or monophasic gel was tested along with triphasic nanocomposite gels for comparison purposes.

EXAMPLE I

A monophasic gel was prepared as follows:

Stoichiometric amounts of $Al(NO_3)_3 \cdot 9H_2O$ (40.365 g.) and $Mg)(NO_3)_2 \cdot 6H_2O$ (13.350 g.) were separately dissolved in 100 and 20 ml of ethyl alcohol respectively at 25° C. These solutions were then combined at 25° C. and to this mixture 30.0 ml of tetraethoxysilane at 25° C., were added while stirring. The clear solution was gelled at 60° C. in a water bath for three days and and the resulting transparent gel was dried in an oven at 100° C.

After drying, the gel was ground in a silicon nitride mortar and pestle, calcined at 400° C. for 24 hours to remove the volatiles and then reground into a fine powder (<75 μm). The powder was pressed into ½ inch diameter pellets at 175 MPa for their use in the sintering step. To maintain consistency, 0.5 mg of powder was weighed for each pellet. A programmed furnace was utilized to achieve stepwise heating schedule. The following heating schedule was used, with variations in the final sintering temperature or duration.

Step 1: Ramp at 6° C./min up to 600° C.;
Step 2: dwell for 2 hours;
Step 3: ramp at 2° C./min up to 830° C.;
Step 4: dwell for 4 hours;
Step 5: ramp at 100° C./hr up to the final sintering temperature eq 1250° C.)
Step 6: dwell for the required duration (e.g., 2 hrs) and;
Step 7: cool to room temperature.

After sintering, the cordierite pellets were analyzed and measured. A micrometer was utilized to determine the diameter of the pellet before and after sintering from which a comparison of linear shrinkage could be made between pellets.

The density of the pellets was found by the Archimedes technique with water as the displacement liquid. Each pellet was thinly coated with paraffin wax to inhibit water from entering any pores and moving through the ceramic body. In this way, the above density could be measured.

To identify the crystalline phases which had formed in the sintered pellet, powder x-ray diffraction (XRD) was used. For this purpose a Scintag/USA Model #PAD-V diffractometer with CuKα radiation was employed. The pellets were then fractured and the micro structure of the fractured surface thereof was determined, using a scanning electron microscope, (SEM) Super-IIIA ISI instrument.

EXAMPLE II

A second type of cordierite gel was prepared as noted below using two sols and a solution to form a triphasic nanocomposite gel and a solution; herein a "two sol gel."

Boehmite (6.733 g) as the source of alumina was dispersed in 60 ml deionized water and peptized with 7 ml 1N $HNO_3$ at 25° C., until an opalescent sol was obtained. A commercial silica sol (20 ml) was slowly added to the Boehmite sol at 25° C. while continuously stirring. The source of magnesium for this gel was in the form of a solution wherein 12.984 g of $Mg(NO_3)_2 \cdot 6H_2O$ was dissolved in 15.0 ml of deionized water at 25° C. and combined with the mixture of sols, again while stirring, to maintain a uniform mixture. The final milky white sol was allowed to gel in a 100° C. oven for 12 hours and subsequently dried at 100° C. for two days.

After drying, the gel was ground, calcined and reground into a fine powder, as discussed above in Example I. The resultant powder was pressed into pellets and sintered, also as discussed above, in Example I. The resulting cordierite pellets were then tested and measured again as described in Example I.

EXAMPLE III

A third type of cordierite gel was prepared using three sols, representing a truly triphasic gel where each component is a discrete nano-scale precursor, herein a "three sol gel". Again Boehmite (6.733 g) served as the source of alumina which was dispersed and peptized as described above. The next component added was a magnesia sol, prepared from an ultra fine (10–15 nm), high purity, magnesia powder. That is, 1.054 g of the magnesia powder was dispersed in 50 ml of deionized water at 95° C., peptized with 1.5 ml of 1N $HNO_3$ and combined with the alumina sol at 25° C. Then 20 ml of the above silica sol was incorporated into the mixture of sols while stirring and the final product was gelled in a 100° C. oven and for 12 hours then dried at 100° C. for two days.

After drying the resulting gel was ground, calcined and reground into a fine (<75 μm) powder, pressed into pellets and sintered, tested and measured, as described above with respect to Examples I and II.

RESULTS

The comparative diameter change of the sintered pellets as measured for each of the above series of gel powders, is plotted as 3 curves, 12, 14 and 16 as shown in FIG. 1.

Linear shrinkage, (%) on the ordinate, is plotted against temperature of sintering (°C.) on the abscissa, in graph 10 of FIG. 1, in which, curve 16 is the plot of cordierite samples made from monophasic gel, as described in Example I; curve 14 is for cordierite samples made from two sol gel per Example II and curve 12 is for cordierite samples made from three sol gel per Example III.

As shown, the three sol gel powder of Example III, exhibits per curve 12, the greatest linear shrinkage upon sintering when compared with the other two gel powder types (curves 14 and 16 of FIG. 1). Such increased shrinkage of the three sol gel powder above, corresponds to increased density of the sintered cordierite product as shown in the graph of FIG. 2.

Figure 2:
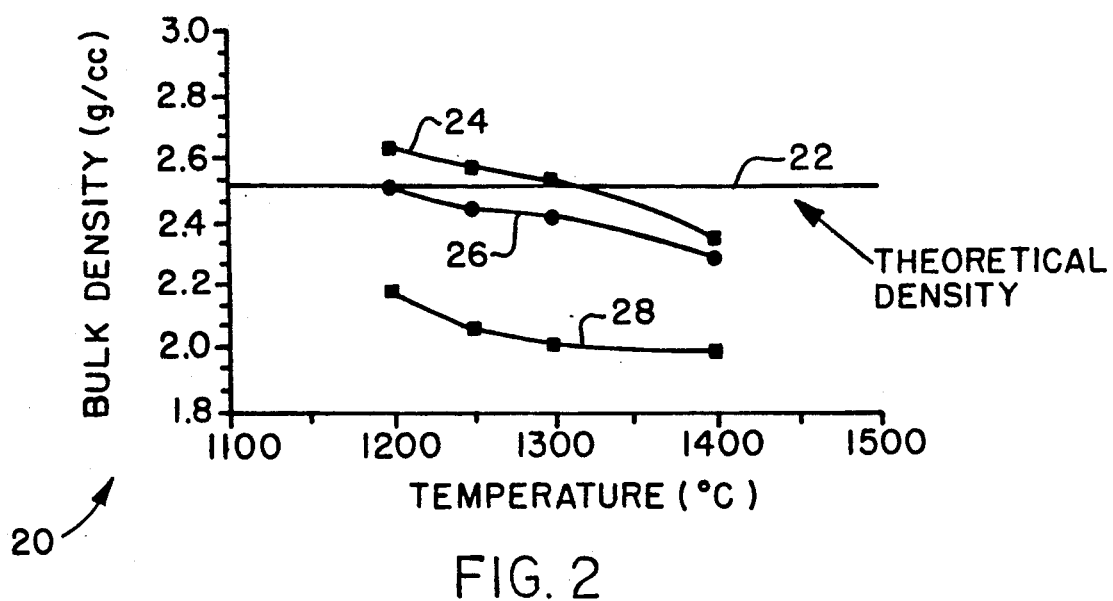
FIG. 2 is a graph showing the comparative densities of the three types of bodies of FIG. 1 upon sintering.

Accordingly, in graph 20, bulk density (g/cc) on the ordinate is plotted against temperature (°C.) on the abscissa, with the 100% theoretical density of cordierite appearing as line 22 at a density of 2.512 g/cc as shown in FIG. 2. Against this standard, is curve 24, showing the density of sintered cordierite samples made from three sol gel per Example III, while curve 26 shows the density of sintered cordierite samples made from two sol gel per Example II and plot 28 shows density performance of sintered cordierite samples made from the monophasic gel per Example I.

As shown in FIG. 2, the bulk density of the sintered cordierite samples made from the three sol gel is higher than that of cordierite samples made from the other two gel types.

As indicated, the above two sol gel samples exhibit lower density than the three sol gel samples of the invention which can be attributed to a non-uniform segregation of MgO in the former compared with the latter.

FIG. 2 also shows 80%, 96% and 100% of theoretical density at 1300° C. for cordierite samples made from monophasic gel, two sol gel and three sol gel, respectively. Note that for this plot, the relative densities were calculated from the theoretical density of α-cordierite (2.512 g/cc). The lower density of the monophasic gels demonstrate the shortcomings of this method as compared with the triphasic nanocomposite gel route per Examples II and III.

In addition to measuring the density of the sintered compact bodies, it is of interest to characterize the phases that have formed therein. For example, the density of the triphasic nanocomposite gel at 1200° C., is higher than the value at 1300° C. because α-cordierite has not completely formed at 1200° C., as revealed by XRD and listed in Table I below. The two nanocomposite triphasic gels formed spinel and cristobalite, which then reacted to produce α-cordierite. This is the situation found at 1200° C., where the formation of α-cordierite has begun and but not gone to completion as evidenced by the presence of the cristobalite and spinel phases.

TABLE I

| GEL TYPE | Phase Identification after Sintering | | |
|---|---|---|---|
| | 1200° C. | 1300° C. | 1400° C. |
| Monophasic | α-cordierite μ-cordierite | α-cordierite | α-cordierite |
| Triphasic Nanocomposite (two sols and one solution) | α-cordierite spinel and cristobalite | α-cordierite | α-cordierite |
| Triphasic Nanocomposite (three sols) | α-cordierite small amounts of spinel and cristobalite | α-cordierite | α-cordierite |

The densities of proportional amounts of spinel and cristobalite are greater than that of cordierite owing to the higher bulk density at 1200° C. than at 1300° C. for the three different gel types. In addition, the crystallization of α-cordierite has progressed further for the three sol gel than for the two sol gel, which accounts for the slightly larger change in density between 1200° C. and 1300° C. for the latter compared with the former, as shown in FIG. 2. The monophasic gel appears to go through a completely different mechanism, as evidenced by the initial crystallization of μ-cordierite which is then transformed to α-cordierite.

The microstructures of the fractured surface of the sintered pellets reveal information about densification behavior and porosity. Compacted bodies prepared according to the methods of Examples I, II, and III, were sintered at 1300° C. for two hours. The resulting pellets were fractured and examined. The pellets from the procedure of Example I, from monophasic gel, showed much porosity, as might be expected from the low density values of such pellets, as indicated by curve 28 in FIG. 2. These pellets were easily broken and crumbled to the touch.

Examination of the pellets made from the two sol gel, per Example II, upon examination, showed that a much denser ceramic had formed, as indicated by the middle curve 26 of FIG. 2. In addition, such fractured surface was considerably smoother and showed 4% porosity or 96% bulk density.

The three sol gel sintered pellets of Example III, showed virtually complete densification with little or no porosity, as indicated by the uppermost curve 24 of FIG. 2. Such completely dense appearance of these last sintered pellets do in fact coincide with the theoretical (100%) bulk density (at 2.512 g/cc at line 22 of FIG. 2) with no pores visible.

Thus triphasic nanocomposite cordierite gels were found to be superior to products of prior art solid state procedures, and to products of monophasic procedures in their improved densification results. Employing sols of, e.g., silica, alumina and magnesia, α-cordierite pellets, which are 100% dense were made without the use of any sintering aids.

More generally, the above examples demonstrate that ceramic materials prepared from the triphasic heterogeneous solution sol-gel (SSG) process have improved purity, density, homogeneity and stoichiometry over the solid state reaction method and improved density and over the monophasic homogeneous SSG route. This is because (atomic sized) monophasic homogeneous gel powders are believed to react too rapidly upon sintering and crystallize before they can completely densify, resulting in a cordierite ceramic of reduced density and increased porosity. On the other hand, the larger micrometer particles react too slowly and insufficiently and the crystallization thereof is not complete, nor density high, thus requiring regrinding and refiring thereof, with the impurity problems noted above. By contrast the triphasic heterogeneous gel powders prepared according to the methods of the present invention, crystallize and densify at about the same time during sintering, i.e. not too fast, which can result in a 100% densified cordierite ceramic, a product not previously seen nor suggested by prior art methods.

Benefits of utilizing triphasic or nanocomposite heterogeneous oxide gels rather than homogeneous solution sol-gels include a further decrease in crystallization temperature and, as noted above, an increase in densification upon sintering.

Further the above multiphased nanocomposite gels are suitable for extrusion into fibers or film, which fibers or film can than be dried and sintered into highly dense fibers or film respectively.

In a variation of the above method of the invention, known as seeding, crystals of α-cordierite are added to crystalline precursors of the same composition, e.g., triphasic nanocomposite gel powder and the resulting mixture is sintered as before. The above seeded crystals accelerate the formation of the sintered cordierite body and also serve to lower the temperature of the sintering process. However seeding of the triphasic gel powders with α-cordierite does not appear to significantly affect the densification of the sintered ceramic product.

As noted above, the triphasic nanocomposite gels are made from mixtures of two or more sols of ceramic precursor oxides, e.g., silica, alumina and/or magnesia and other precursor oxides listed above.

The triphasic nanocomposite gel particles, before and after grinding, are sized between 1 to 20 nanometers and preferably between 5 and 20 nanometers.

The triphasic nanocomposite powder gel of the present invention is ground into powder in a mortar with a pestle or other suitable grinding means.

The triphasic nanocomposite gel powder is pressed into a compact body at 150 to 200 MPa and preferably at about 175 MPa.

The triphasic nanocomposite gel in the form of fiber, film or compacted body is sintered at between 1100° C. to 1400° C. and preferably at between 1250° C. to 1350° C., e.g. at 1300° C., for two to six hours and preferably for four hours. The α-cordierite ceramic made by the method of the present invention, can have a density of up to 2.512 g/cc and is desirably in the range of 2.480 to 2.512 g/cc.

While the invention has been particularly described with reference to the preferred embodiments thereof, it will be understood by those skilled in the art that various changes in substance and form can be made therein without departing from the spirit and the scope of the invention as described and/or claimed herein.

What is claimed is:

1. A method for manufacture of cordierite precursor gel suitable for manufacture of dense cordierite bodies comprising, mixing at least two sols of nano ceramic precursor oxides to make a compositionally triphasic nanocomposite gel.

2. A method for manufacture of dense cordierite bodies comprising, mixing at least two sols of nano ceramic precursor oxides to make a compositionally triphasic nanocomposite gel, suitable for manufacture of said bodies, drying said gel, grinding the so dried gel into powder, pressing said powder into a compact body and sintering said body into a ceramic of high density.

3. The method of claim 2 wherein said body is sintered at between 1100° C. to 1400° C.

4. The method of claim 2, wherein said body is sintered at between 1250° C. and 1350° C.

5. The method of claim 1 wherein three sols of said oxides are mixed to make said gel.

6. The method of claim 1 wherein at least one of said oxides is selected from the group consisting of silica, alumina and magnesia.

7. The method of claim 2 wherein the heat of reaction of said oxides contributes to the sintering thereof.

8. The method of claim 7 wherein said gel is of heterogeneous particles on a nanometer scale and is converted by sintering into a ceramic of homogeneous composition.

9. The method of claim 2 wherein said compact body is sintered into a ceramic of low porosity.

10. The method of claim 9 wherein said compact body is sintered, without sintering aids, into a ceramic 96% to 100% dense.

11. The method of claim 2 wherein said compact body is sintered into a ceramic having a density of between 2.480 to 2.512 g/cc.

12. The method of claim 2 wherein said gel is seeded with cordierite particles to accelerate the sintering of said compact body into a high density ceramic.

13. A high density cordierite body made from a compositionally triphasic nanocomposite gel of ceramic precursor oxides.

14. The cordierite body of claim 13 having low porosity and being free of sintering aids.

15. The cordierite body of claim 13 being 96 to 100% dense.

16. The cordierite body of claim 13 having a density of from 2.480 to 2.512 g/cc.

17. The cordierite body of claim 13 having a density of from 2.500 to 2.512 g/cc.

18. A high density cordierite body made from a compositionally triphasic nanocomposite gel which has been dried, ground and pressed into an article of desired shape and sintered at between 1100° C. and 1400° C.

19. The cordierite body of claim 13 wherein said oxides are selected from the group consisting of silica, alumina and magnesia.

20. A compositionally triphasic nanocomposite cordierite gel having a mixture of at least two sols of nano ceramic precursor oxides.

21. The gel of claim 20 wherein said oxides are selected from the group consisting of silica, alumina and magnesia.

22. The gel of claim 20 having triphasic gel particles sized between 1 to 20 nanometers.

* * * * *